A. J. SNOW, A. M. KIDD & J. H. WHALEY.
VALVE.
APPLICATION FILED APR. 2, 1913.

1,114,303.  Patented Oct. 20, 1914.

WITNESSES:
Charles Pickles
Thos Easthing

INVENTORS
Albert J. Snow,
Archie M. Kidd,
John H. Whaley
BY G. H. Strong.
ATTORNEY

UNITED STATES PATENT OFFICE.

ALBERT J. SNOW, ARCHIE M. KIDD, AND JOHN H. WHALEY, OF TAFT, CALIFORNIA.

VALVE.

1,114,303. Specification of Letters Patent. Patented Oct. 20, 1914.

Application filed April 2, 1913. Serial No. 758,368.

*To all whom it may concern:*

Be it known that we, ALBERT J. SNOW, ARCHIE M. KIDD, and JOHN H. WHALEY, all citizens of the United States, residing at Taft, in the county of Kern and State of California, have invented new and useful Improvements in Valves, of which the following is a specification.

This invention relates to a valve of the ball check type.

The object of this invention is to provide a simple and cheaply manufactured ball valve which will be particularly adapted for use in duplex pumps, and the like, handling oil or water under high pressure, which oil or water carries a certain percentage of mud, sand, or the like.

Another object of the invention is to provide a novel form of valve cage by which the lift of the ball valves may be adjusted, and which will allow a free circulation of the pumped fluid in all directions, thus preventing the collection of any sand or gravel which might interfere with the operation of the valve.

The invention consists of the parts and the construction and combination of parts as hereinafter more fully described and claimed, having reference to the accompanying drawings, in which—

Figure 1:
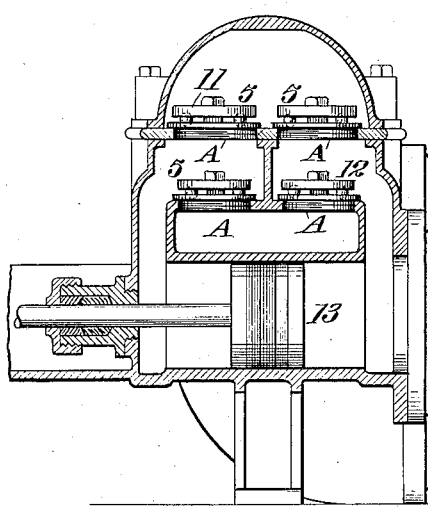
Figures 2, 3:
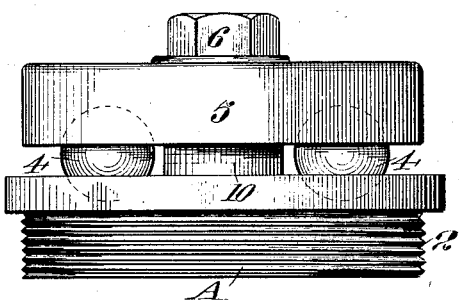
Figure 4:
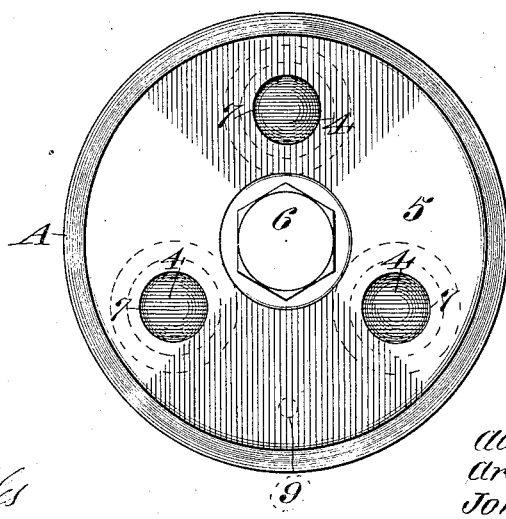

Figure 1 is a central section through the valve chest of a standard form of duplex pump showing the application of the valve. Fig. 2 is a side elevation of the valve proper. Fig. 3 is a central section of same. Fig. 4 is a plan view of the valve.

Referring to the drawings, A indicates the valve seat which may be designed to fit any make of pump using a check or lift valve. The valve may be threaded on the outside, as at 2, to screw in the pump, or, it may be tapered to slip in or turned to a shoulder and secured in place by cap screws. The valve seat A is drilled to form three or more openings or seats 3, which are normally closed by a similar number of steel balls 4, the movements of which are controlled by a valve cage 5 adjustably secured with relation to the valve seat proper by a central bolt 6. The valve cage is also provided with three or more openings 7, the inner ends of which are tapered, as at 8. These openings are so positioned as to register with the corresponding valve seat openings 3; the proper register being maintained by any suitable means, or, as here shown, by the dowel pin 9.

Interposed between the valve cage and the valve seat proper and surrounding the bolt 6 is a suitable number of perforated disks 10. These are provided for the purpose of adjusting the distance between the valve seat and cage, or in other words, to increase or decrease the lifting movement of the several ball valves.

In operation, by referring to Fig. 1, it will be seen that the valves 11 and 12 will be lifted on the outward movement of the piston 13. This is caused by the pressure of the incoming fluid on the lower side of the several valves. Any sand or like material entering with the oil or water and discharging through the several openings 3 in the valve seat A which might have a tendency to lodge between the valve cage and the seat proper and thus tend to interfere with the movements of the ball valves 4 will in this instance be entirely removed the moment back pressure is created by the reverse movement of the piston. This is caused by the reverse movement of the fluid which will enter through the upper portions of the openings 7 and cause the several ball valves 4 to be seated and also discharge any lodged sand, or like material, which might have been deposited between the cage and the valve seat proper. Such lodged material would thus be removed at every reciprocal movement of the piston by the reverse movement of the fluid passing between the cage and the valve seat proper in its passage through the pump.

We wish it understood that this form of valve may be fitted in any standard pump, such as the duplex types, either in connection with high or low pressure, and that it has proved of great advantage when handling such fluids as oil and water containing a heavy deposit of mud, sand, or gravel, this being especially encountered when drilling oil wells and when circulating the water through the standard tools.

By providing means for adjusting the lift of the valve a greater efficiency and quicker action of the valve movement may be secured under different pressures, thus tending to increase the efficiency of the pump. By using an all steel valve when handling heavy materials, such as oils and muddy water, less trouble is encountered as the ball valves are self-adjusting, self-seating and automatic in operation. The all-steel construction makes it possible to case harden the various wearing parts and will thus materially increase the life of the valve.

The materials and finish of the several parts of the apparatus may be such as the experience and judgment of the manufacturer may dictate.

We wish it understood that various changes in form, proportions and minor details of construction may be resorted to within the scope of the appended claim and that we do not wish to limit ourselves to the exact construction here shown.

Having thus described our invention, what we claim and desire to secure by Letters Patent is—

A pump valve consisting of a relatively thick lower member having a plurality of transverse openings flared at their upper ends to form valve seats, a ball valve in each seat, a relatively thick upper member having a plurality of transverse openings similar to the openings of the lower member flared at their lower ends so as to provide housings which extend up into the body of the upper member and aline with the openings of the lower member to enable the ball valves to be received within the housings, and a bolt passed through the upper member and having its lower end threaded into the lower member, said members being spaced at such distances that the upper portions of the balls project into the housings at all times.

In testimony whereof we have hereunto set our hands in the presence of two subscribing witnesses.

ALBERT J. SNOW.
ARCHIE M. KIDD.
JOHN H. WHALEY.

Witnesses:
 E. A. FLANDERS,
 FRED P. BOLSTAD.